A. A. BROWN.
NUT LOCK.
APPLICATION FILED JULY 21, 1909.

948,039.

Patented Feb. 1, 1910.

WITNESSES:
Frank B. Wooden.
E. Walton Brewington.

INVENTOR
Aaron A. Brown,
BY Henry J. Brewington.
Attorney

UNITED STATES PATENT OFFICE.

AARON A. BROWN, OF ROLAND PARK, MARYLAND.

NUT-LOCK.

948,039.     Specification of Letters Patent.     Patented Feb. 1, 1910.

Application filed July 21, 1909. Serial No. 508,794.

*To all whom it may concern:*

Be it known that I, AARON A. BROWN, a citizen of the United States, residing at Roland Park, in the State of Maryland, have invented certain new and useful Improvements in Nut-Locks, of which the following is a specification.

My invention relates to an improvement in nut-locks as applicable to bolts, axles and the like, and has for its object to provide an extremely inexpensive, durable and efficient lock for nuts of the ordinary kind. The further object of the invention being to provide a locking device of a character which may be easy to apply and remove, and very effective for the purpose intended.

With the foregoing objects in view my invention consists in certain novel features of construction, combination, and arrangement of parts which will be hereinafter described and pointed out in the claim.

Figure 1:
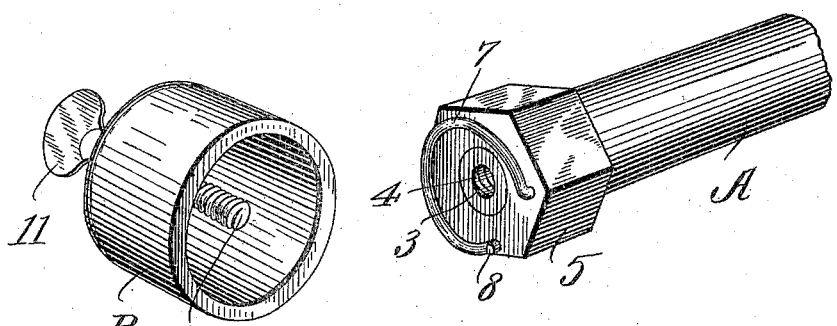
Figure 2:
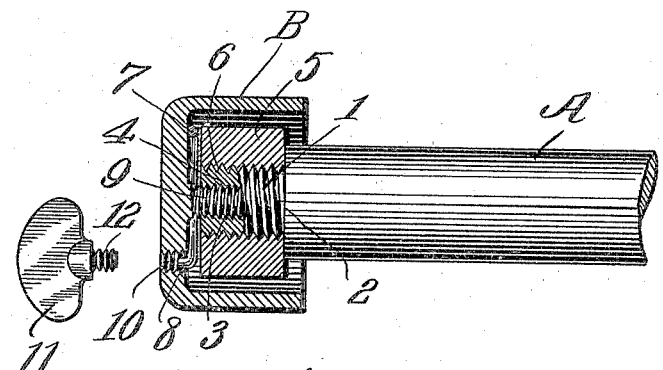

In the accompanying drawings, forming a part of this specification Figure 1, is a perspective view of the nut-lock with the cap removed from the nut, and Fig. 2, is a longitudinal section of the same and being in locked position.

A represents a bolt, axle or the like, threaded on the end as indicated at 1, and having a shoulder 2 provided thereon adjacent to the threaded end portion. The bolt A on the threaded end portion being centrally bored at 3 a predetermined depth and threaded at 4.

5 indicates an ordinary nut threaded at 6 and adapted to be screwed on the threaded end portion 1 of the bolt A. Secured on the outer end of the nut 5, by any suitable means, is a substantially circular shaped spring 7, the free end of which is extended upwardly as indicated at 8, the purpose of which will be hereinafter described.

B, indicates a cap, having a threaded stem 9 centrally provided therein, this stem may be made integral with the cap or may be made separate and secured therein by any suitable means, too well known to those skilled in the art to demand description here, as may be desired.

The threads provided on the stem 9 are oppositely disposed to the threads 1 on the bolt A, the purpose of which will presently appear.

Within the periphery of the cap B is provided a threaded opening 10, into which is adapted to be screwed a thumb screw or key 11, by which means the spring 7 is unlocked, that the cap may be removed.

My device is operated as follows: The nut 5 is screwed on the threaded end portion 1 of the bolt A flush against the shoulder 2 thereon. The stem 9 of the cap B is then screwed within the threaded opening in the end of the bolt; by this means the cap B is drawn down over the nut 5, at the same time depressing the spring 7, until the turned up end 8 of the spring becomes engaged in the opening 10 of the cap, thereby locking the cap over the nut, and by reason of the threads on the stem 9 of the cap being oppositely disposed to the threads 1 on the bolt A on which the nut 5 is screwed, the nut is securely locked on the bolt, and prevented from turning.

To effect the removal of the cap, the thumb screw 11, which operates as a key is screwed within the opening 10 of the cap B, until the end 12 of the screw is flush with the inner surface of the top of the cap, whereby the end 8 of the spring 7 is forced out of the opening 10, and the cap rendered free to be unscrewed and removed. After the cap is removed the nut 5 may be removed in the ordinary manner, consequently the device is capable of subsequent use, as may be desired.

Slight changes and alterations might be resorted to in the form and arrangement of the several parts herein described without departing from the spirit and scope of my invention, and hence I do not wish to limit myself to the exact construction as herein set forth; but, Having fully described my invention, what I claim as new and desire to secure by Letters Patent, is:

A nut-lock comprising a bolt threaded on one end thereof, and centrally bored and threaded within the said end portion, a nut screwable thereon, a cap, having a threaded stem centrally secured therein, and screwable within the said threaded bored portion of the said bolt, thereby securing the said cap over the said nut, a circular shaped spring, one end of which is secured on the said nut, interposed between the said cap and nut, means provided in the said cap for engaging with the free end of the said spring, and means for disengaging the said spring and cap, substantially as described.

In testimony whereof I affix my signature in presence of two witnesses.

AARON A. BROWN.

Witnesses:
E. WALTON BREWINGTON,
MARY M. MAGRAW.